(12) United States Patent
Koehler

(10) Patent No.: US 9,456,340 B2
(45) Date of Patent: Sep. 27, 2016

(54) UNSOLICITED BROADCAST PACKET TRANSMISSION THROUGH CLOSE-BY COMMUNICATION PROTOCOL

(75) Inventor: Yannick Koehler, Montreal (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 1029 days.

(21) Appl. No.: 13/172,545

(22) Filed: Jun. 29, 2011

(65) Prior Publication Data
US 2013/0005256 A1    Jan. 3, 2013

(51) Int. Cl.
*H04W 40/00*    (2009.01)
*H04W 8/26*    (2009.01)
*H04W 76/02*    (2009.01)

(52) U.S. Cl.
CPC ............ *H04W 8/26* (2013.01); *H04W 76/02* (2013.01)

(58) Field of Classification Search
USPC .......... 455/507, 432.1, 41.2, 466, 434, 465, 455/419, 422, 435, 515, 517, 552; 370/469, 370/328, 349, 312, 442, 324
See application file for complete search history.

(56) References Cited

U.S. PATENT DOCUMENTS

| | | | |
|---|---|---|---|
| 5,208,665 A * | 5/1993 | McCalley et al. ............ 725/119 |
| 5,790,952 A * | 8/1998 | Seazholtz et al. ......... 455/432.1 |
| 6,014,545 A * | 1/2000 | Wu et al. ...................... 725/118 |
| 6,092,191 A * | 7/2000 | Shimbo et al. ............... 713/153 |
| 6,101,255 A * | 8/2000 | Harrison et al. ............... 380/52 |
| 6,240,513 B1 * | 5/2001 | Friedman et al. ............ 713/152 |
| 6,424,717 B1 * | 7/2002 | Pinder et al. ................. 380/239 |
| 7,356,011 B1 * | 4/2008 | Waters et al. ................. 370/338 |
| 7,992,788 B2 * | 8/2011 | Koenck et al. .......... 235/472.01 |
| 2006/0026162 A1 * | 2/2006 | Salmonsen et al. ............ 707/10 |
| 2008/0002740 A1 * | 1/2008 | Ramachandran et al. .... 370/469 |
| 2009/0029728 A1 * | 1/2009 | Shen et al. .................... 455/507 |
| 2009/0254975 A1 | 10/2009 | Turnbull et al. |
| 2009/0282130 A1 | 11/2009 | Antoniou et al. |
| 2010/0063889 A1 | 3/2010 | Proctor et al. |
| 2010/0322213 A1 | 12/2010 | Liu et al. |

OTHER PUBLICATIONS

Schramm, M., Aug. 11, 2010, Apple Patents "exciter" Technology for Devices, Including a "CycloComputer," <http://www.tuaw.com/2010/08/11/apple-patents-exciter-technology-for-devices-including-cyc/>.

* cited by examiner

*Primary Examiner* — Ganiyu A Hanidu
(74) *Attorney, Agent, or Firm* — Mannava & Kang, P.C.

(57) ABSTRACT

A method is provided for generating a broadcast packet at a first device including an address; transmitting the generated broadcast packet to a second device through a first protocol. The first device may communicate with the second device via the transmitted address through a second protocol different from the first protocol. Alternatively, an apparatus is provided to receive an unsolicited broadcast packet including an address through a wireless, close-by communication protocol; extract from the broadcast packet identification information about the remote device; and store the extracted identification information in association with the remote device. Alternatively, a computer-readable medium is provided storing instructions to receive a an unsolicited broadcast packet including an address through a first protocol; extract from the broadcast packet identification information, including the address and a service available at the remote device; and communicate with the remote device via a second protocol.

20 Claims, 4 Drawing Sheets

UNSOLICITED BROADCAST PACKET TRANSMISSION THROUGH CLOSE-BY COMMUNICATION PROTOCOL

BACKGROUND

In a network having multiple devices, it may be possible that a first device is not aware of, and thus may not communicate with, a second device. As such, in order for the first device to communicate with the second device, information regarding the second device may be manually entered at the first device in order to facilitate communication. Even if the two devices are in close proximity to each other, the first device may be unable to communicate with the second device until information regarding the second device is manually entered at the first device or until a user of the second device provides input at the second device in order to enable the second device to receive information from the first device to facilitate communication.

DRAWINGS

FIG. 1. is an example diagram of a system environment, in accordance with an example embodiment of the present disclosure.

DETAILED DESCRIPTION

When establishing communication between a first device and a second device in a network, an address may be manually entered into one of the devices. In order to have the address manually entered into one of the devices, the user should know the address. If the address of the device is not known, it may be difficult to obtain, for example, if the address is not plainly indicated on the outside of the device. Further, it may be cumbersome for a user to manually enter the address into their device. Still further, the user may be unaware of a device that is in close proximity to the user's device. Thus, the user may miss a convenience of utilizing a service at a device that is in close proximity to the user's device.

Overview

As discussed herein, an unsolicited broadcast packet may be generated at a first device within a network. The broadcast packet may include an address of the first device, a service that may be provided by the first device, etc. The broadcast packet may be transmitted through a wireless, close-by communication protocol. A protocol may be a set of rules that two devices use when communicating.

A second device may receive the unsolicited broadcast packet from the first device. Information in the broadcast packet, for example, the address and the service provided at the first device, may be extracted from the broadcast packet and stored at the second device. The second device may communicate with the first device at the address included in the broadcast packet through a protocol different than the wireless, close-by communication protocol used to transmit the broadcast packet. Once the address is stored at the second device, the service of the first indicated in the broadcast packet may be utilized by the second device.

System Environment

Figure 1:
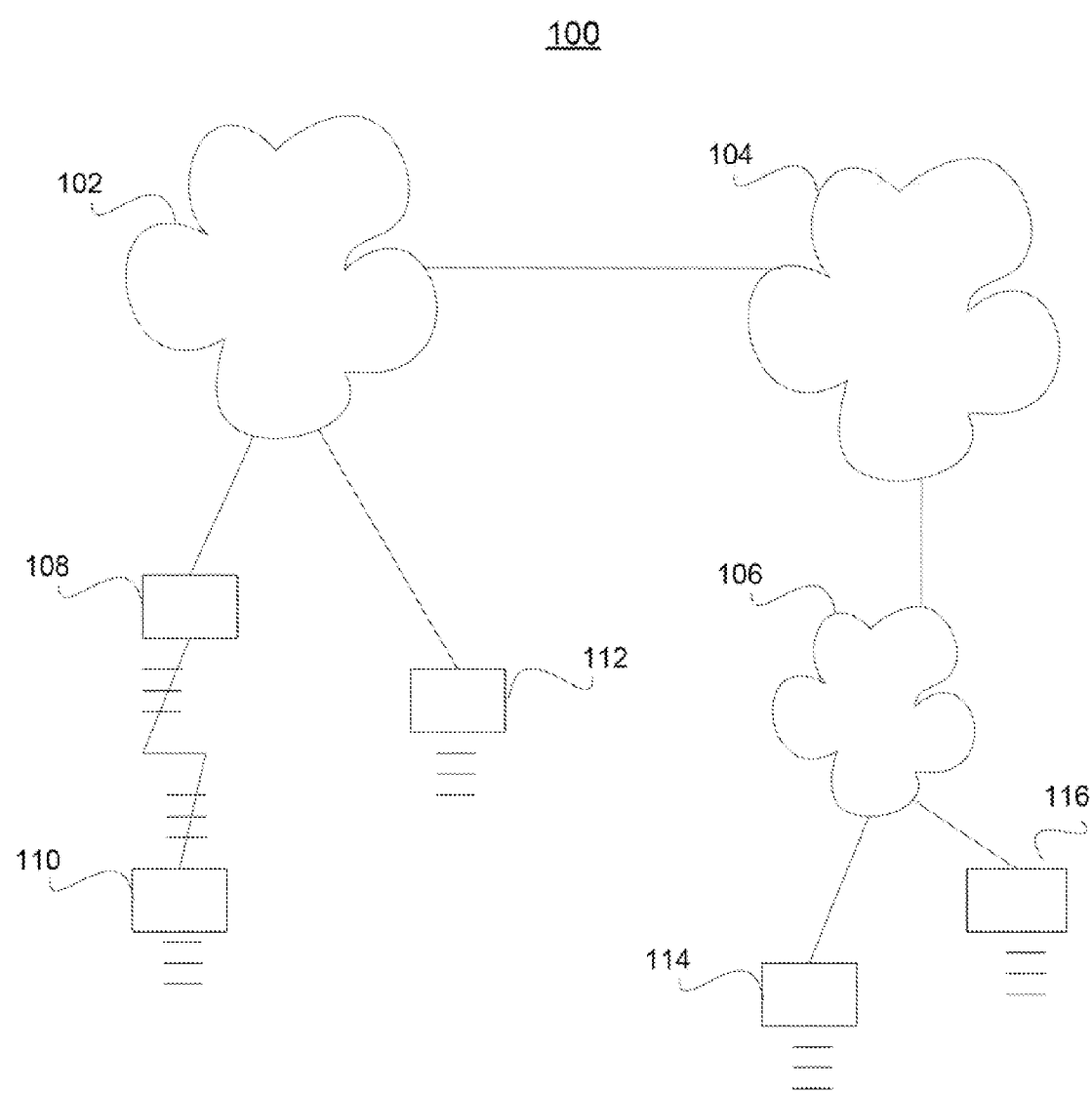

FIG. 1 is an example system environment in accordance with an example embodiment of the present disclosure. As shown in FIG. 1, system environment 100 includes networks 102, 104, 106. Network 102 may be implemented as any wide area network (WAN) or local area network (LAN) in accordance with the functionality as discussed herein. For example, network 102 may be implemented as any wired or wireless network, including an enterprise network, Global System for Mobile Communication (GSM) network, wideband code division multiple access (WCDMA), general packet radio services (GPRS), personal communication services (PCS), worldwide interoperability for microwave access (WiMAX), local area network (LAN), etc. Network 104 may be implemented as a wide area network (WAN) for example, the Internet, etc. Network 106 may be implemented as any wired or wireless, including any wide area network (WAN) or local area network (LAN) in accordance with the functionality as discussed herein. For example, network 102 may be implemented as an enterprise network, Global System for Mobile Communication (GSM) network, wideband code division multiple access (WCDMA), general packet radio services (GPRS), personal communication services (PCS), worldwide interoperability for microwave access (WiMAX), local area network (LAN), etc. It may be appreciated that more or less networks may be incorporated in system environment 100.

System environment may further include device 108, which may be implemented as, for example, a wireless access point. Device 108 may be communicably linked to network 102 and may be able to communicate wirelessly. System environment 100 may further include device 110, which may be implemented as any computing device, for example, a laptop computer, a desktop computer, a mobile computing device, a personal digital assistant (PDA), camera, printer, scanner, etc. Device 110 may be able to communicate wirelessly, for example, using a wireless, close-by communication protocol, etc. Device 110 may be communicably linked to device 108 in order to facilitate access to network 102. System environment may further include device 112, which may be implemented as, for example, a printing device, a scanning device, any computing device such as a laptop computer, a desktop computer, a mobile computing device, a personal digital assistant (PDA), camera etc. Device 112 may be communicably linked to network 102 and may be able to communicate wirelessly, for example, using a wireless, close-by communication protocol, etc.

System environment 100 may further include device 114. Device 114 may be implemented as any computing device, for example, a laptop computer, a desktop computer, a mobile computing device, a personal digital assistant (PDA), camera, printer, scanner, etc. Device 114 may be communicably linked to network 106 and may be able to communicate wirelessly, for example, using a wireless, close-by communication protocol, etc. System environment may further include device 116. Device 116 may be implemented as any computing device, for example, a laptop computer, a desktop computer, a mobile computing device, a personal digital assistant (PDA), camera, printer, scanner, etc. Device 116 may be communicably linked to network 106 and may be able to communicate wirelessly.

It may be appreciated that system environment 100 may include more, less, and/or different computing devices, networks, etc., than depicted in FIG. 1.

Device Configuration

Figure 2:
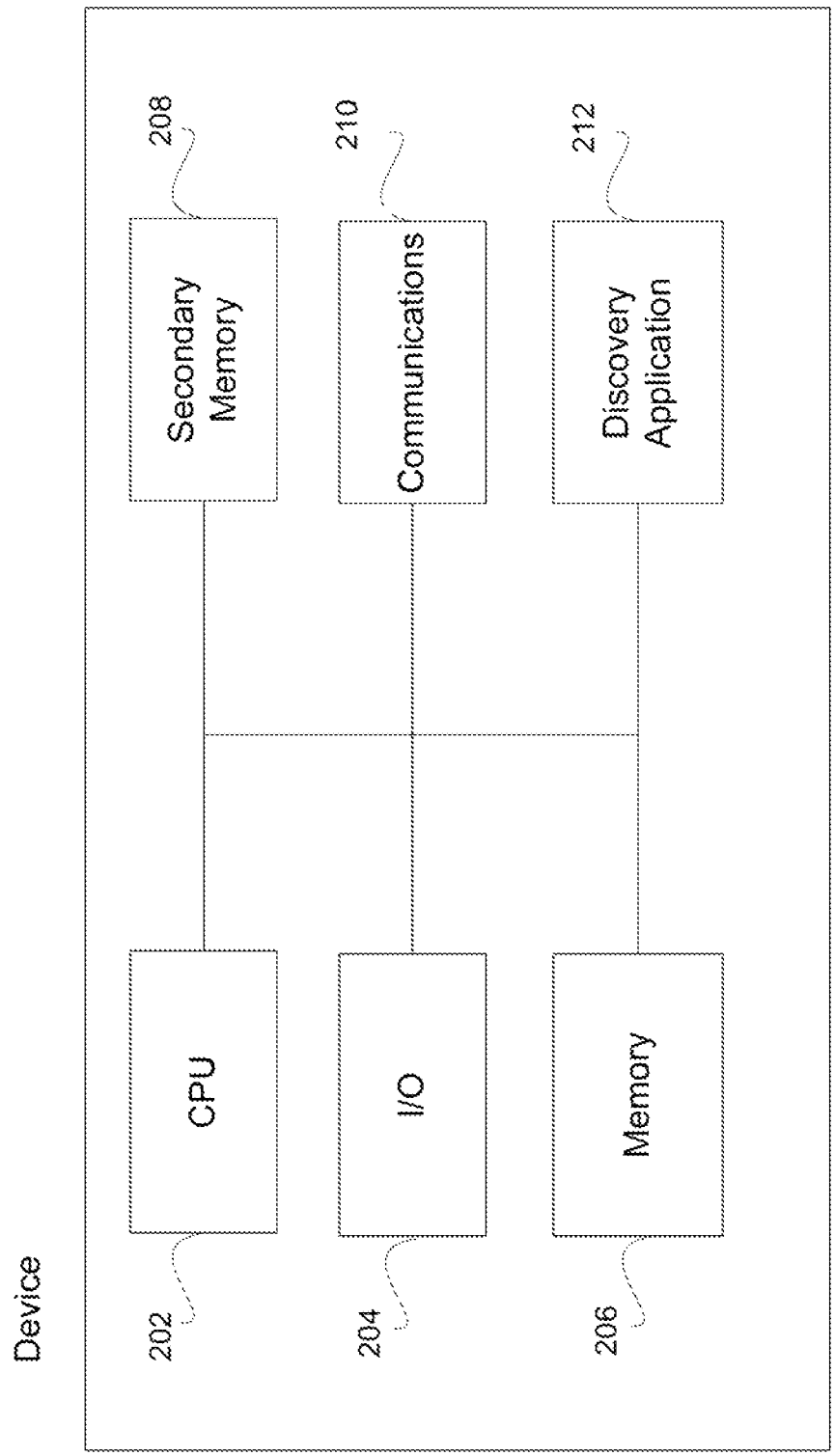
FIG. 2 is an example block diagram of a device within the system environment of FIG. 1, in accordance with an example embodiment of the present disclosure.

FIG. 2 depicts an example device configuration in accordance with an example embodiment of the present disclosure. The device configuration depicted in FIG. 2 may include the configuration for any computing device, for example, a laptop computer, a desktop computer, a mobile computing device, a personal digital assistant (PDA), a printer, a scanner, etc. The device depicted in FIG. 2, may be the configuration of one or more of devices 110, 112, 114, 116.

As shown in FIG. 2, a device may include a central processing unit 202, input/output devices 204, memory 206, secondary memory 208, communications 210 and discovery application 212. The device may be implemented through any suitable combinations of software including machine readable instructions, firmware, including machine readable instructions, and/or hardware. Secondary memory may be implemented within the device and/or may be implemented as external data storage. Primary and/or secondary memory may be computer-readable mediums configurable to store applications as discussed herein. Primary and/or secondary memory may further be configurable to receive an installation pack from an external memory, for example, a portable computer-readable medium, for example, a Compact Disc/Digital Video Disc, etc. Memory 206 or memory 208 may store a close-by-device table that includes a list of close-by devices together with information associated with the close-by devices, for example, identifying information of the close-by device, one or more services associated with the close-by device, and address associated with the service of the close-by device, a time indicating receipt of the most recently received broadcast packet, etc. Communications 210 may enable communication with other devices utilizing multiple wired and/or wireless communication protocols, at least one of the protocols being a wireless, close-by communication protocol. Input/output devices 204 may include a display, a user input device, for example, keyboard, touch screen, mouse, etc. to facilitate user interaction with a user interface.

Discovery application 212 may facilitate discovery of the device to other devices within the network, as will be more fully discussed below.

Figure 3:
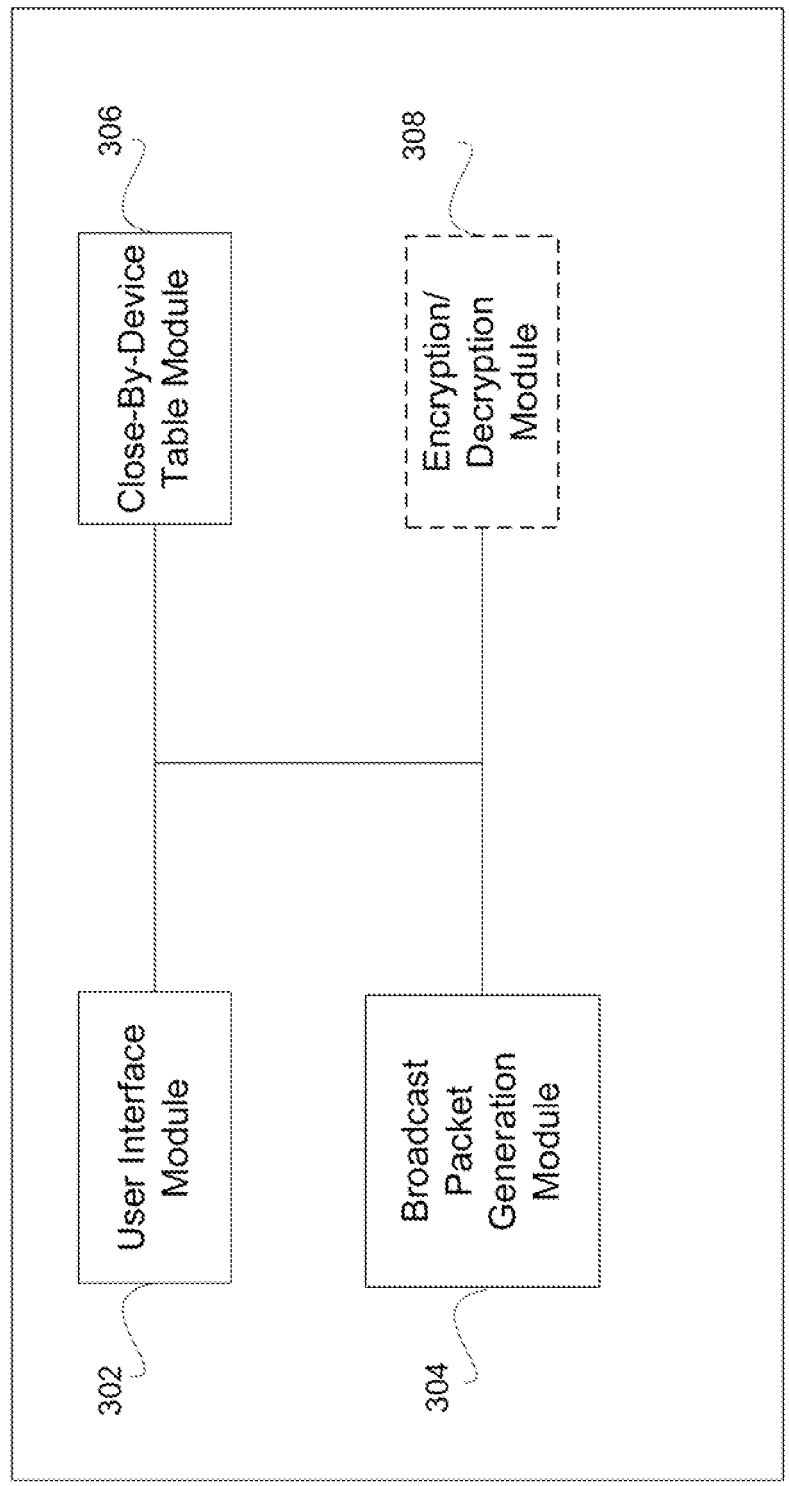
FIG. 3 is an example diagram of a discovery application, in accordance with an example embodiment of the present disclosure.

FIG. 3 depicts an example block diagram of the components of the discovery application 212 depicted in FIG. 2. As shown in FIG. 3, discovery application 212 includes a user interface module 302. User interface module may provide a user of the device with an interface. The interface may enable creation, selection, etc., of identification information about the device that may be included in a broadcast packet. Identification information may include, for example, the device identification number, make, model, etc., services that are provided by the device, for example, protocols that the device may communicate with, etc., physical location of the device, network identification, for example, address (for example, IP address, email address, Uniform Resource Locator (URL), etc.), etc. In addition, the frequency in which the broadcast packet is to be sent may be specified.

Discovery application 212 may further include packet generation module 304. Packet generation module 304 may generate a broadcast packet. The broadcast packet may be generated based on information selected using the user interface module 302. Alternatively, the broadcast packet may be generated with default information included therein. The broadcast packet may include the address of the device, for example, being an IP address, an email address, a (URL), etc. The broadcast packet may further include one or more services offered at the device. The address included in the broadcast packet may correspond to the service that is offered at the device.

Discovery application 212 may further include close-by-device table update module 306. Close-by-device table update module 306, may facilitate updating the close-by-device table with information received in retransmitted broadcast packets as will be more fully discussed below.

Discovery application 212 may further alternatively include encryption/decryption module 308. Encryption/decryption module 308 may include information that is used to encrypt or decrypt broadcast packets. For example, encryption/decryption module may include a pre-shared key, may include public key infrastructure (PKI) functionality, or other forms of security. Encryption/decryption module 308 may, for example, encrypt broadcast packets to be transmitted to other devices using an encryption algorithm utilizing a key and may decrypt broadcast packets using, for example a corresponding key. The broadcast packet may be encrypted in such a manner that a management frame of the broadcast packet may not be encrypted so that broadcast packet may be received as other devices within wireless, close-by-communication range. However, the payload portion of the broadcast packet may be encrypted so that only devices that are permitted to access the device transmitting the broadcast packet may decrypt the payload portion of the packet.

Discovery application 212 may further include extraction module 310. Extraction module 310 may extract identification information from received packets, for example, the address, service, etc., and store the information in, for example, a close-by-device table in memory or secondary memory.

Packet Generation

Figure 4:
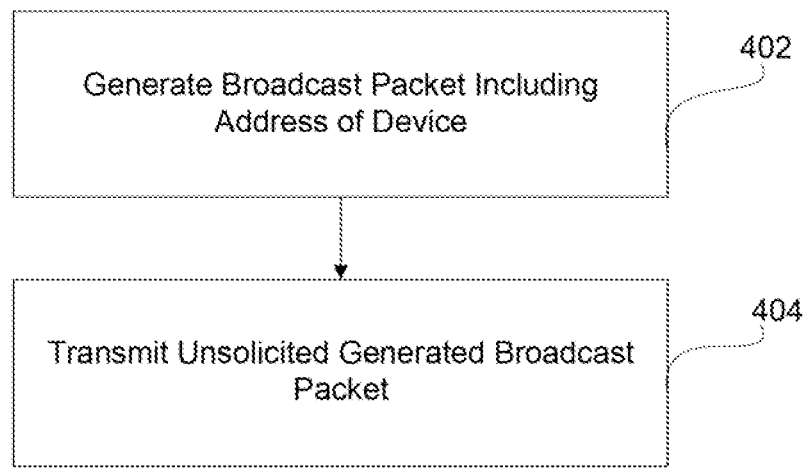
FIG. 4 is an example flow diagram of a method for transmitting a broadcast packet, in accordance with an example embodiment of the present disclosure.

FIG. 4 depicts an example flow diagram of the steps for generating and transmitting a broadcast packet in accordance with an example embodiment. As can be seen in FIG. 4, a broadcast packet is generated at the first device. The broadcast packet includes the address of the first device (Step 402). The generated broadcast packet may be transmitted through a first protocol, the first protocol being a wireless, close-by communication protocol (Step 404). The generated packet may be transmitted as a beacon broadcast packet, where any device within range of the close-by-communication may receive the broadcast packet. The broadcast packet may be sent without any interruption to the operation of the first device and without any interruption to normal behavior of the wireless protocol. The generated broadcast packet may not be solicited from any device. As such, a device receiving the unsolicited broadcast packet may receive the packet without any user interaction to facilitate receipt of the broadcast packet. The transmitting device may not be aware of the existence of the receiving device in the network. The generated broadcast packet may be transmitted without previous communication with the second device. The first device may then communicate with the second device via the transmitted address communicated in the broadcast packet through a second protocol that is different from the first protocol. This communication may take place when the second device, having received the broadcast packet, establishes communication with the first device through a second protocol.

For example, network 102 may be implemented as an enterprise network, network 104 may be implemented as the Internet, network 106 may be implemented as a GSM network, device 114 may be implemented as a cellular telephone and computing device and device 112 may be implemented as a network printer. Further, in this example, the printer may be a first device that is broadcasting information about the printer to the cellular telephone 114. Telephone 114 may be in close proximity to printer 112 and telephone 114 may not be aware of printer 112, nor have the IP address of the printer 112 stored therein.

For example, in applying the method disclosed in FIG. 4, printer 112 may generate a broadcast packet for transmission. The broadcast packet may include the address of the printer 112, a location of the printer 112, a service that is available at the printer 112, etc. The address of the printer may be in the form of an IP address that the printer may be accessed through. The service may be a printing service. The printer may transmit the generated broadcast packet through a wireless, close-by communication protocol. The printer 112 may communicate with the cellular telephone 114 via a second protocol, for example, through the enterprise network 102. A third protocol may be utilized for communication between printer 112 and cellular telephone 114, for example, internet 104 or GSM network 106.

Alternatively, a device may transmit the broadcast packet to a proxy device where the proxy device may receive the beacon broadcast packet and re-transmit the beacon broadcast packet to a larger physical area. For example, the printer 112 may transmit the broadcast packet to the wireless access point, where the wireless access point acts as a proxy device, where the proxy device may transmit the broadcast packet to a larger physical area.

Still alternatively, the device may encrypt a payload portion of the broadcast packet prior to transmission using an encryption algorithm, for example, a pre-shared key, PKI, etc.

Still alternatively, the second or third protocol used for later communication may have security requirement on its own, unrelated to the security requirement used for the discovery process via wireless, close-by communication protocol. For example once a device has received the address of another device and has identified a compatible service to use, additional security requirements may be employed, for example, the end-user may be prompted to enter additional configuration information such as username/password or pin, etc, to get access via those particular services identified in the broadcast packet.

Packet Reception

Figure 5:
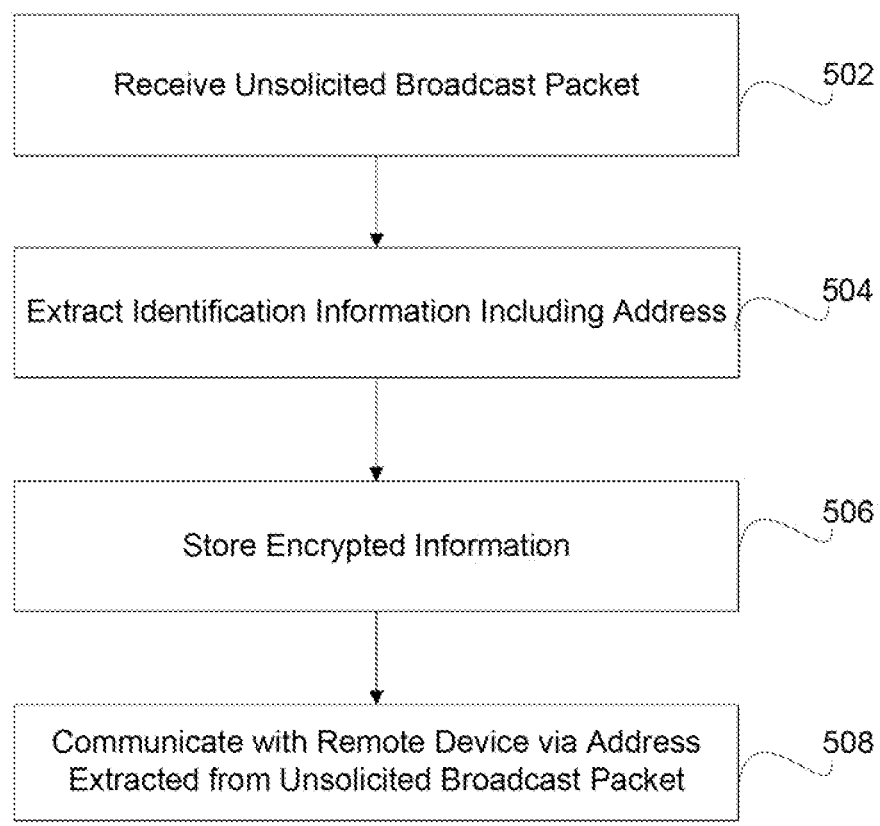
FIG. 5 depicts an example flow diagram of a method for receiving a broadcast packet, in accordance with an example embodiment of the present disclosure.

FIG. 5 depicts an example flow diagram of a method for receiving a broadcast packet, in accordance with an example disclosure. As shown in FIG. 5, an unsolicited broadcast packet is received from a remote device through a first protocol, the first protocol being a wireless, close-by communication protocol (step 502). The broadcast packet may be received by the device without any interruption to the operation of the device and without any interruption to normal behavior of the wireless protocol. The broadcast packet may include an address. Identification information about the remote device is extracted from the received broadcast packet (step 504). The identification information extracted from the broadcast packet may include the address of the remote device and a service available at the remote device. The extracted information may be associated with the remote device and stored (Step 506). Using the address extracted from the broadcast packet, communication with the remote device may be established via the address extracted from the unsolicited broadcast communication packet via a second protocol (Step 506).

In considering the example discussed above with regard to FIG. 4, the cellular telephone 114 may receive the transmitted broadcast packet. If the payload of the broadcast packet is encrypted, the cellular telephone may decrypt the payload of the broadcast packet using a corresponding decryption algorithm, for example, corresponding pre-shared key, etc. If the cellular telephone cannot decrypt the payload portion of the packet, then the cellular telephone will not enter any information into the close-by-device table. The cellular telephone 114 may extract information from the received broadcast packet, including the address. A record may be created in a close-by-device table stored at the cellular telephone 114. The record may include the identification information including the address of the printer 112 extracted from the broadcast packet.

The broadcast packet may further include one or more services available at printer 112 that generated the broadcast packet. The available one or more services may be extracted from the broadcast packet at the cellular device and stored in the close-by-device table in association with the printer 112. As the record is created in the close-by-device table of the cellular telephone, when a printing function is desired at the cellular telephone, the printing application may access the close-by-device table to access a list of devices available to provide printing services. As printer 112 was added to the table, printer 112 may appear on the list of devices available to perform the printing service. The desired printing device, for example, printer 112, may be selected and the cellular device 114 may print to printer 112 via the address extracted from the broadcast packet and included in the close-by-device table. Thus, printer 112 may be registered in the close-by-device table without interaction by the user of the cellular telephone 114.

Using the address, the cellular telephone may communicate with the printer 112 through GSM network 106, internet 104 and enterprise network 102.

Printer 112 may retransmit the generated broadcast packet periodically, for example, every 60 seconds, every minute, etc. The cellular telephone 114 may receive the retransmitted broadcast packets and update the date and time the retransmitted broadcast packet was received in the close-by-device table. Alternatively, if there is any change in the information that is transmitted in the broadcast packet from the printer 112, the printer 112 record in the close-by-device table may be updated with the changed information. Alternatively, if a retransmitted broadcast packet is not received within a predetermined period of time, for example, 1 day, etc., the record associated with the device in the close-by device table may be deleted.

Alternatively, the close-by-device table may have a maximum number of devices it may store. If the number of cellular device receives a broadcast packet from a device that does not have a record in the close-by-device table, one or more records stored in the close-by-device table may be deleted based on a predetermined algorithm, for example, FIFO, FILO, etc.

Alternatively, the generated broadcast packet may be encrypted, for example, with a pre-shared key such that only devices with the corresponding pre-shared key may decrypt the broadcast packet.

While the example provided above explains the action of printer 112 and cellular telephone 114, cellular telephone 114 may generate and transmit an unsolicited broadcast packet where the address may be the cellular telephone's telephone number. The unsolicited broadcast packet may be transmitted, as discussed, through wireless, close-by communication protocol and may be received by, for example another cellular device within range. The other cellular device may receive the broadcast packet, extract the address, or telephone number, of cellular telephone 114, and store the information in the close-by-device table. The other cellular telephone may then access the telephone number of the device when the telephone application is running at the other cellular device.

Other examples of communication between two devices as discussed herein may be a computing device, for example, a mobile computing device, laptop, PDA, etc., broadcasting an IP address to a scanner, where the network scanner may communicate with the device using the IP address to transmit a scanned document.

In another example, a computing device receiving a broadcast packet from a printing device including an address, where the computing device may use the address to print emails.

In another example, the unsolicited broadcast packet may be transmitted, as discussed, through wireless, close-by communication protocol by a printing device, or a storage device, and may be received by, for example a camera within range. The camera may receive the broadcast packet, extract the address, of the printer 112, and store the information in the close-by-device table. The camera may then access the printer 112 at the extracted address and transmit image data to the printer or storage device.

I claim:

1. A method, comprising:
   generating a broadcast packet at a first device including an internet protocol address of the first device;
   transmitting the generated broadcast packet through a first protocol, the first protocol being a wireless, close-by communication protocol, wherein the transmission of the generated broadcast packet is not solicited by a second device; and
   receiving, in the first device, a communication from the second device via the internet protocol address communicated in the broadcast packet through a second protocol that is different from the first protocol, wherein the second protocol comprises a set of rules that the first device and the second device use to communicate packets of data over a local area network.

2. The method of claim 1,
   wherein receiving the communication from the second device further comprises receiving the communication from the second device through the second protocol via a third protocol.

3. The method of claim 1, wherein the broadcast packet includes identification information of the first device and services available at the first device.

4. The method of claim 1, further comprising:
   retransmitting the generated broadcast packet at periodic intervals.

5. The method of claim 1, wherein generating a broadcast packet includes:
   selecting identification information to include in the broadcast packet from a plurality of identification information; and
   generating the broadcast packet to include the selected identification information.

6. The method of claim 1, wherein the first device comprises a printer and wherein receiving the communication in the first device from the second device further comprises receiving data to be printed by the printer.

7. The method of claim 1, further comprising:
   encrypting the generated broadcast packet.

8. The method of claim 3, further comprising:
   receiving an indication of the identification information to include in the broadcast packet from an interface presented on a display.

9. An apparatus, comprising:
   a receiver to receive an unsolicited broadcast packet from a remote device through a wireless, close-by communication protocol, the unsolicited broadcast packet including an internet protocol address of the remote device;
   an extraction module to extract from the unsolicited broadcast packet, identification information about the remote device, including the internet protocol address of the remote device;
   storage to store the extracted identification information in association with the remote device; and
   a transmitter to transmit a communication to the remote device via the internet protocol address of the remote device through a second protocol that is different from the first protocol.

10. The apparatus of claim 9, wherein the unsolicited broadcast packet is encrypted, said apparatus further comprising:
    a decryption module to decrypt the received unsolicited broadcast packet with a pre-shared key.

11. The apparatus of claim 9, wherein the storage is further to store information pertaining to a relationship between the remote device and a service, wherein the relationship is determined based upon an association between the service and the identification information included in the broadcast packet.

12. The apparatus of claim 11, wherein the apparatus is a mobile computing device and the remote device is a printer.

13. The apparatus of claim 9, wherein:
    the receiver is to receive the unsolicited broadcast packet from the remote device periodically, the broadcast packet including the identification information of the remote device;
    the extraction module is to extract the identification information of the remote device from the unsolicited broadcast packet each time the unsolicited broadcast packet is received; and
    the storage is to update a date and time each time the unsolicited broadcast packet is received from the remote device.

14. The apparatus of claim 13, wherein the internet protocol address of the remote device, the identification information about with remote device, and the time and date the unsolicited broadcast packet is received is stored in a close-by-device list in the storage.

15. The apparatus of claim 9, wherein the receiver is to receive the broadcast packet from the remote device through a proxy device.

16. The apparatus of claim 11, further comprising:
    a display device to display an indication that the service of the remote device is available at the apparatus.

17. A non-transitory computer-readable medium, storing a set of instructions, that when executed by a processor, cause the processor to:
  receive an unsolicited broadcast packet from a remote device through a first protocol, the first protocol being a wireless, close-by communication protocol, the unsolicited broadcast packet including an internet protocol address of the remote device and a service available at the remote device;
  extract from the unsolicited broadcast packet, identification information about the remote device, including the internet protocol address of the remote device and the service available at the remote device;
  store the extracted identification information in association with the remote device; and
  communicate with the remote device via the internet protocol address extracted from the unsolicited broadcast communication packet via a second protocol that is different from the first protocol.

18. The non-transitory computer-readable medium of claim 17, wherein the instructions are further to cause the processor:
  receive the unsolicited broadcast packet from the remote device periodically;
  extract the identification information of the remote device from the unsolicited broadcast packet each time the unsolicited broadcast packet is received; and
  update a date and time each time the unsolicited broadcast packet is received from the remote device.

19. The non-transitory computer-readable medium of claim 18, wherein the instructions are further to cause the processor to:
  remove the extracted identification information of the remote device from the storage when an unsolicited broadcast packet has not been received from the remote device within a predetermined period of time.

20. The non-transitory computer-readable medium of claim 17, wherein the unsolicited broadcast packet is encrypted, and wherein the instructions are further cause the processor to:
  decrypt the received unsolicited broadcast packet with a pre-shared key.

* * * * *